Figure 12:
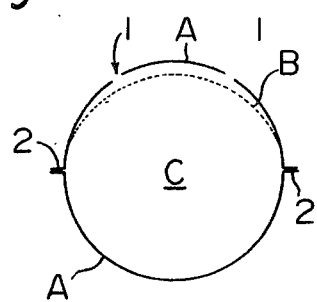
Figure 12:
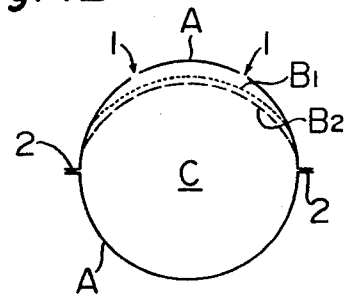

United States Patent [19]
Inoue et al.

[11] 4,139,159
[45] Feb. 13, 1979

[54] FLEXIBLE MULTILAYER TUBULAR STRUCTURE FOR IRRIGATION AND PROCESS FOR ITS PREPARATION

[75] Inventors: Naofumi Inoue; Itsuro Furukawa, both of Iwakuni; Toshio Usami, Ohtake, all of Japan

[73] Assignee: Mitsui Petrochemical Industries Ltd., Tokyo, Japan

[21] Appl. No.: 800,175

[22] Filed: May 25, 1977

[30] Foreign Application Priority Data

Jun. 1, 1976 [JP] Japan .............................. 51-69611[U]

[51] Int. Cl.² .................... B05B 15/00; B05B 3/16; F16L 11/04
[52] U.S. Cl. .................................. 239/547; 239/145; 428/36; 156/290; 156/252
[58] Field of Search ...................... 156/290, 252, 553; 239/145, 547; 428/36, 131, 138

[56] References Cited
U.S. PATENT DOCUMENTS

| | | | |
|---|---|---|---|
| Re. 28,095 | 7/1974 | Chapin | 239/145 |
| 3,777,987 | 12/1973 | Allport | 239/547 |
| 3,830,067 | 8/1974 | Osborn | 239/145 |
| 3,989,572 | 11/1976 | Swartz | 156/272 |

*Primary Examiner*—Douglas J. Drummond
*Attorney, Agent, or Firm*—Sherman & Shalloway

[57] ABSTRACT

A plastic tubular irrigating structure is provided for agricultural and other irrigation systems. The structure comprises (A) a flexible outer layer of a thermoplastic synthetic resin tube having at least one continuous fin-like heat-sealed portion along its length and watering orifices, and (B) a flexible inner layer, as a filter, of a water-permeable, water-insoluble sheet, preferably a nonwoven fibrous sheet, fixed partly to the inside of the outer layer (A), the inner layer (B) being permeable to a larger amount of water than the outer layer (A). In the absence of water supply, the structure is a flattened tube, but upon supply of water therethrough, it assumes an expanded tubular shape.

11 Claims, 23 Drawing Figures

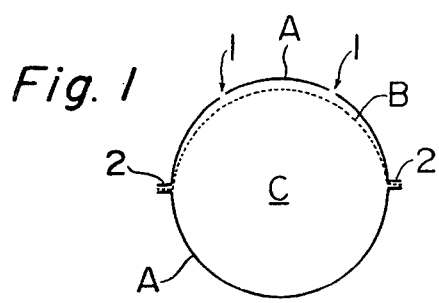
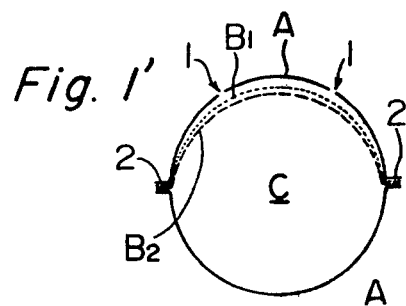
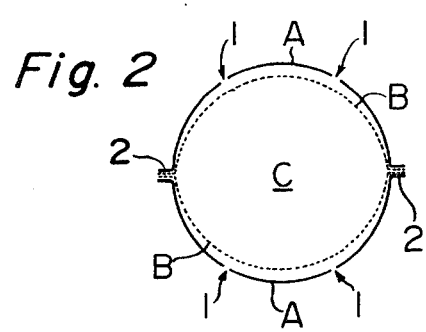
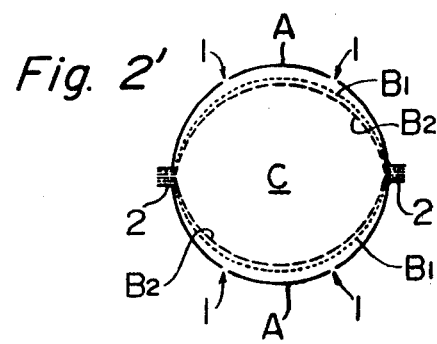
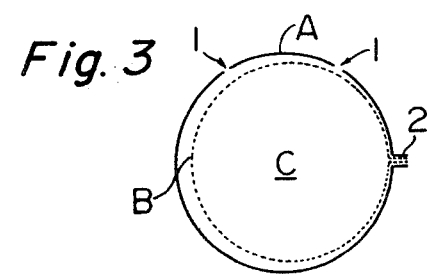
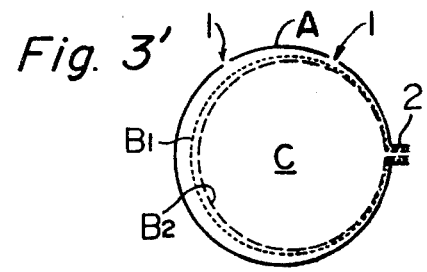
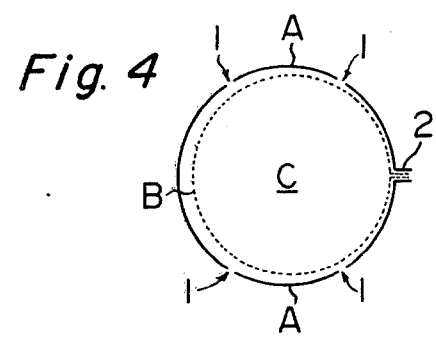
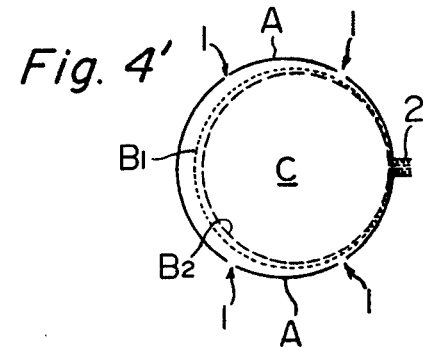

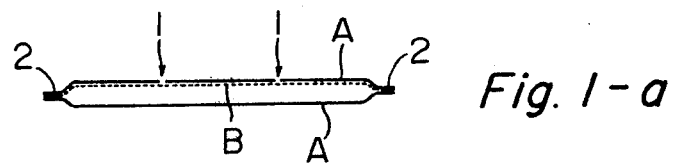
Fig. 1-a
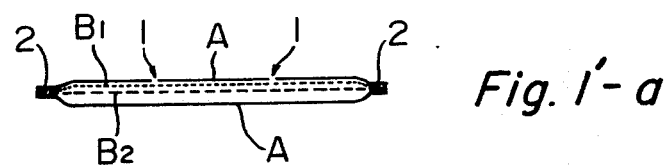
Fig. 1'-a
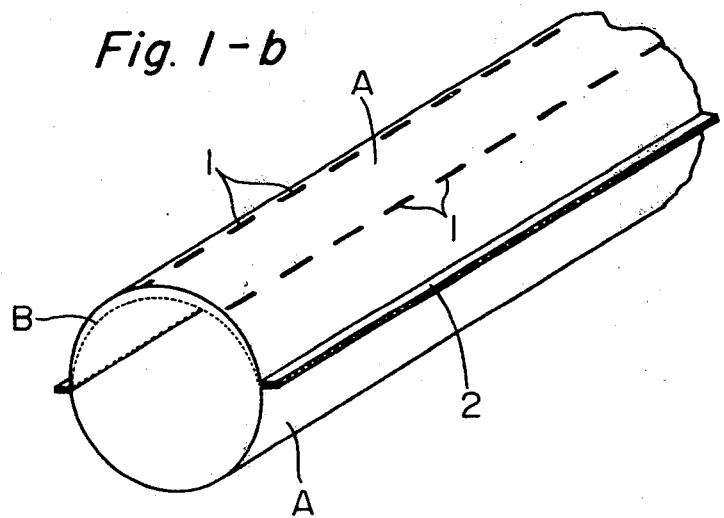
Fig. 1-b

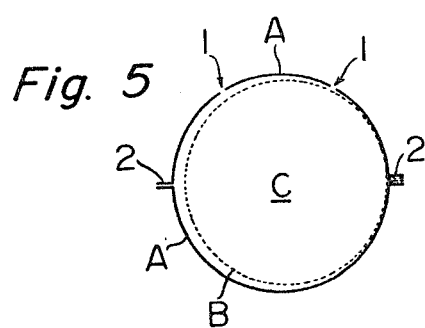
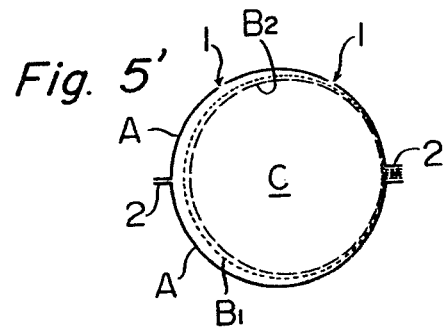
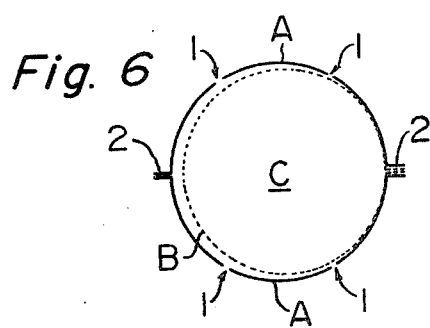
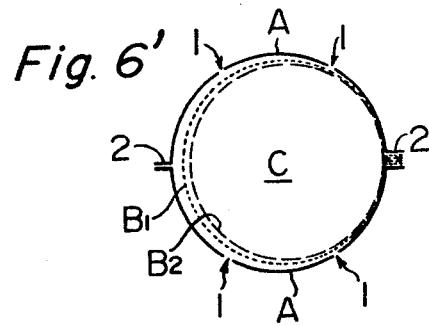
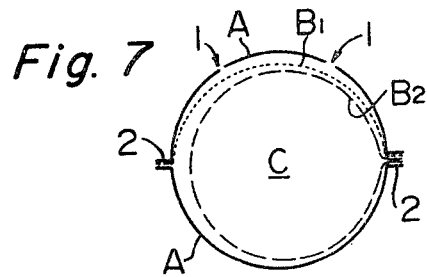
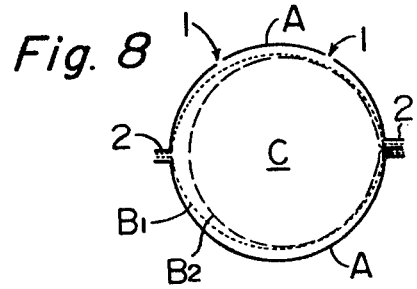
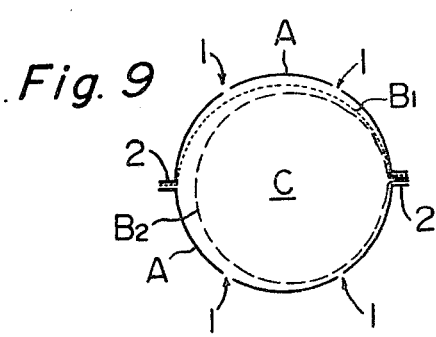
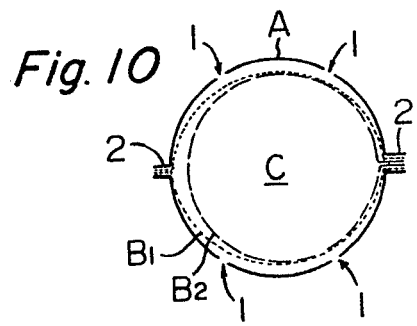

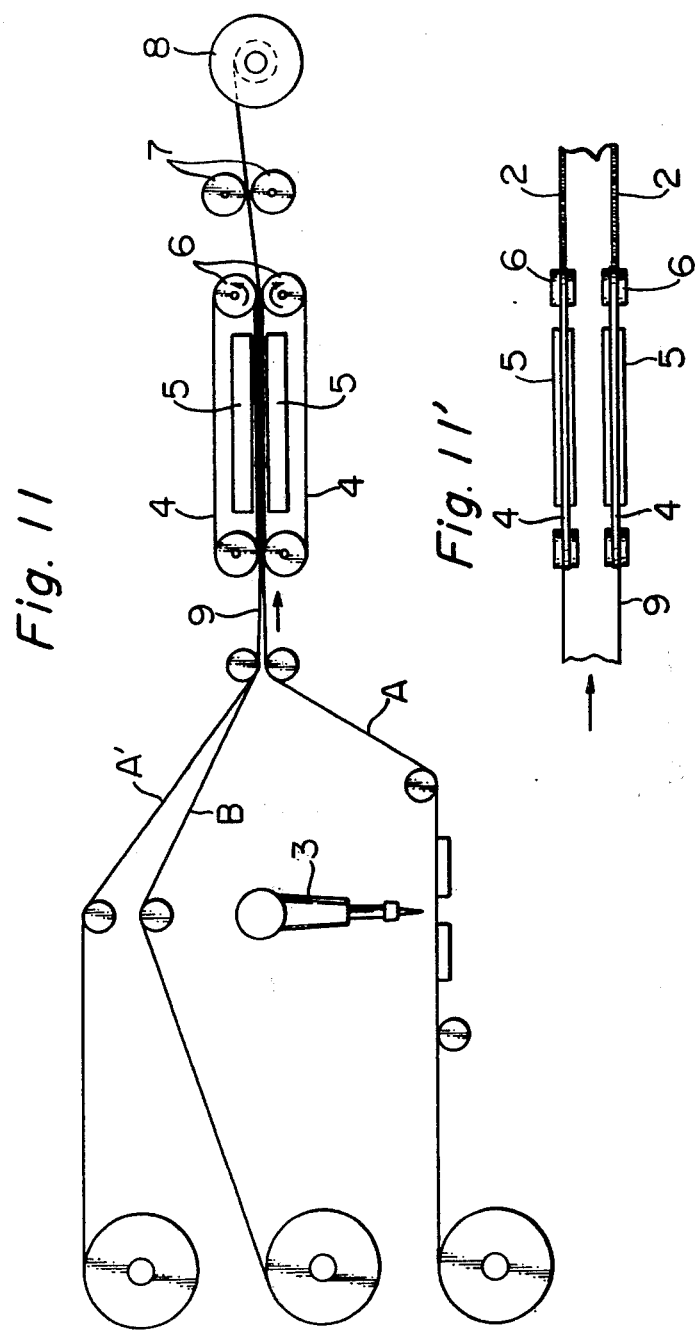

FLEXIBLE MULTILAYER TUBULAR STRUCTURE FOR IRRIGATION AND PROCESS FOR ITS PREPARATION

This invention relates to a flexible multilayer tubular structure for use in an irrigation system, which is cheap, light-weight, and easy to handle, install, package, store and transport, undergoes little clogging, and has a wide range of applications; and to a process for producing such a tubular structure. The tubular structure conveniently permits irrigation of an extensive area at relatively low watering pressures. Since it can be installed in any desired manner in conformity, for example, to the change of the type of spacings between cultivated crops or to the topographic conditions of an area to be watered, no restriction is imposed on its installation by the type of a crop to be irrigated, its manner of planting, or the topographic conditions of an area to be watered. The tubular structure can achieve application of not only water but also liquid fertilizers and water solutions of various chemicals such as insecticides, acaricides, fungicides, antiviral agents, herbicides, and dust-proofing agents. The structure can also be used for sub-irrigation at fairly shallow depths.

More specifically, the invention provides a multilayer tubular structure for irrigation, which comprises (A) a flexible outer layer comprising a tube of a thermoplastic synthetic resin film having at least one continuous fin-like heat-sealed portion extending longitudinally of the outer layer and a plurality of watering orifices spaced longitudinally of the outer layer at given intervals, and (B) a flexible inner layer comprising a water-permeable, water-insoluble sheet, preferably a wholly water-permeable, water-insoluble sheet such as a non-woven fabric, located inwardly of the outer layer and fixed to the outer layer, said sheet being permeable to a larger amount of water than the film which constitutes the outer layer (A); said tubular structure assuming an expanded tubular shape when water is passed through it and a flattened tubular shape when water is not passed through it, the outer layer (A) and the inner layer (B) being isolated from each other over a greater part of the structure at least including the watering orifices in the outer layer, and the inner layer (B) being located inwardly of the outer layer (A) so that water supplied passes through the inner layer (B) and flows out from the watering orifices in the outer layer (A).

Rigid synthetic resin pipelines or metal pipelines having many watering orifices have been extensively used in irrigation systems for agriculture and horticulture, for dust prevention of sandy lands and other types of clear land and for melting the snow. The present invention provides a unique multilayer tubular structure suitable for such irrigation systems. Conventional tubular structures of this type are pipes which always retain their hollow cylindrical shape. For ensuring suitable amounts of watering per unit pipe length and per unit time and for proper maintenance of the flowing power of water, it is desired to use perforated or porous pipes having a great number of minute watering orifices.

Irrigation water is frequently derived from natural sources such as rivers, ponds, lakes and wells, and contains no small amounts of minute solid foreign particles. These foreign particles may easily block up the orifices of the irrigation pipelines and reduce their function within short periods of time. The porous pipes, moreover, are expensive, and are therefore difficult to use in practical applications.

For this reason, the conventional rigid synthetic resin pipes or metallic pipes are used with many watering orifices of suitable sizes, usually about 0.5 to 2 mm in diameter, provided therein. It is fairly complicated and costly to provide such small orifices, and even with these orifices, the pipes are frequently blocked up. The current practice is, therefore, to provide a filter at the inlet portion of a water-supplying pipe, and to supply water to the irrigation pipelines through the filter. In such a case, water should be supplied under increased pressure. Moreover, the filter itself is very easily blocked up, and it is necessary to increase the water pressure further. Another disadvantage is that the filter must be exchanged at very short time intervals. These disadvantages become greater when the pipelines are used to irrigate an extensive area. In addition, installation of these pipes is not easy and needs high labor costs. Piping of such an irrigation system requires many pipe joints. It is furthermore difficult to change piping design once pipelines have been installed, and re-piping of the irrigation pipelines according to the change of spacings between cultivated crops, the topographic conditions of an area to be watered, etc. is complicated, time-consuming, and costly.

We have extensively worked to overcome the disadvantages associated with the conventional irrigation pipelines. The work finally led to the accomplishment of a flexible multilayer tubular structure composed of (A) a flexible outer layer comprising a tube of a thermoplastic synthetic resin film having a plurality of watering orifices, preferably slit-shaped ones, spaced longitudinally of the outer layer at given intervals, and (B) a flexible inner layer of controlled amounts of water permeation which is located inwardly of the outer layer (A), serves also as a filter, and is composed preferably of a non-woven fabric, the inner layer (B) being located inwardly of the outer layer (A) so that water supplied passes through the inner layer (B) and flows out from the watering orifices in the outer layer (A), said tubular structure assuming an expanded tubular shape when water is passed through it and a flattened tubular shape when water is not passed through it. We have found that the flexible tubular structure in accordance with this invention is cheap, light-weight, readily disposable, and easy to handle, install, package, store and transport. It is also free from the trouble of pipeline blockage, and permits irrigation of a very broad area at very low water-supplying pressures. The tubular structure of the invention can overcome all of the disadvantages of the conventional irrigation pipeline systems. It has also been found that the outer layer (A) includes at least one continuous fin-like heat-sealed portion which produces an anchoring effect of preventing the zig-zag and other undesirable movements of the tubular structure during the watering operation. The provision of such a heat-sealed portion also brings about the advantage that the inner layer (B) can be easily fixed to the heat-sealed portion simultaneously with the formation of the heat-sealed portion. The excellent advantages of the tubular structure of the invention are also ascribable to the fact that the outer layer (A) and the inner layer (B) are isolated from each other over a greater part of the tubular structure at least containing watering orifices, preferably over the substantially entire area of the structure except the fixed parts.

It is an object of this invention therefore to provide a multilayer tubular structure for use in an irrigation system which has the many improvements described above, and assumes an expanded tubular shape when water is passed through it and a flattened tubular shape when water is not passed through it.

Another object of this invention is to provide a process for producing a multilayer tubular structure of the above structure easily at low costs.

Still another object of this invention is to provide methods for irrigating various areas, for example, agricultural and horticultural lands such as upland farms, lowland fields, orchards, greenhouse sites, meadows, lawns and artificial forests, cultivated plants grown in such lands, dust-occurring areas such as sandy ground, clear lands and roads, and snowfalling areas for snow melting purposes.

The above and other objects and advantages of the present invention will become more apparent from the following description.

The multilayer tubular structure for irrigation in accordance with the present invention consists of the flexible outer layer (A) and the flexible inner layer (B) which is located inwardly of the outer layer (A) and fixed to the fin-like heat-sealed portion of the outer layer (A), or to the outer layer (A) at a position parallel thereto.

The outer layer (A) comprises a tube of a thermoplastic synthetic resin film and has at least one continuous fin-like heat-sealed portion extending longitudinally of the outer layer and a plurality of watering orifices, preferably slit-shaped ones, spaced longitudinally of the outer layer at given intervals. The film has water-permeability because of the orifices provided in it, and the orifices permit the releasing of water out of the tube. Preferably, the outer layer (A), except the orifices, is substantially impermeable to water, and the film is water-insoluble. If desired, the film may be a wholly water-permeable foamed resin film having small open cells in addition to watering orifices.

The inner layer (B) comprises a water-permeable, water-insoluble sheet which is permeable to a larger amount of water than the outer layer (A) through the watering orifices, and serves also as a filter. The sheet of the inner layer (B) may be composed of a thermoplastic resin film of the same type as used in the outer layer (A) which has orifices or pores provided therein so as to render it more permeable to water than the outer layer (A). Preferably, however, it is a porous film or sheet composed of a fibrous material such as a woven, knitted or non-woven fabric made of natural, synthetic or regenerated fibers. Inorganic fibrous materials can also be used.

The multilayer tubular structure of the invention assumes an expanded tubular shape when water is passed through it, and a flattened tubular shape when water is not passed through it. The flexible outer layer (A) and the flexible inner layer (B) are isolated from each other over a greater part of the structure at least including the watering orifices, preferably over the substantially entire area of the structure excepting the heat-sealed portion. The inner layer (B) is located inwardly of the outer layer (A) so that water forced into the tubular structure passes through the inner layer (B) and flows out from the watering orifices of the outer layer (A).

The thermoplastic synthetic resin film that forms the outer layer (A) is any synthetic resin film which can render the outer layer (A) flexible. Examples of resins which will form such films are olefinic synthetic resins such as polymers or copolymers of olefinic monomers (e.g., ethylene, propylene, butene-1 or 4-methyl-pentene-1), or copolymers of at least one such monomer with at least one diene; vinyl-type synthetic resins such as polymer or copolymers of vinyl monomers such as styrene, vinyl alcohol, acrylic acid, alkyl acrylates, methacrylic acid, alkyl methacrylates, vinyl chloride, vinylidene chloride or vinyl acetate, or copolymers of at least one such monomer with at least one olefinic monomer copolymerizable with it; ester-type synthetic resins such as polyethylene terephthalate, polyethylene-2,6-naphthalate, or polymers derived from glycols or their functional derivatives and dicarboxylic acids or their functional derivatives; amide-type synthetic resins such as nylon resins; polyurethanes; and blends of the resins described.

These resin films may be foamed films. They may also contain additives such as ultraviolet absorbers, antioxidants, inorganic or organic fillers, or coloring agents.

There is no special restriction on the thickness of the outer layer (A) so long as it assumes an expanded tubular shape at the time of passing water through it and a flattened tubular shape when water is not passed through it. The thickness can be selected according to the type of the synthetic resin used. For example, the suitable thickness is about 0.05 to about 1.0 mm.

As previously stated, the inner layer (B) is a film or sheet preferably made of a fibrous material suitable for filtering purposes, such as a knitted, woven or non-woven fabric.

Examples of preferred fibrous materials that form the inner layer (B) are fibers of thermoplastic synthetic resins exemplified with regard to the outer layer (A), natural vegetable fibers, regenerated vegetable fibers, natural animal fibers, natural mineral fibers such as asbestos, other mineral fibers such as glass fibers or rock fibers, and mixtures of these in any desired combinations.

Especially preferably, the inner layer (B) of the multilayer tubular structure of this invention is composed of a water-permeable non-woven sheet which is obtained by forming fibers of a thermoplastic synthetic resin and other fibers which do not melt at the melting point of the synthetic resin into a sheet form, and heat-treating the resulting structure at a temperature above the melting point of the thermoplastic synthetic resin fibers but below the temperature at which the other fibers melt, thereby to bond the fibers to one another.

The orifice size and the amount of water permeation of the water-permable non-woven sheet can be adjusted to the desired values by properly selecting the types of sheet-forming materials, their sizes, the proportion of the other fibers, the thickness of the resulting sheet, etc.

The thermoplastic synthetic resin fibers used to form such a water-permable non-woven sheet include a combination of fibers of synthetic resins of the types exemplified above with regard to the outer layer (A) which can melt at low temperatures, and fibers of another resin which can melt at a far higher temperature, for example about 200° C., the natural or regenerated fibers or mineral fibers exemplified above, and mixtures of these with fibers of higher melting synthetic resins. The sheet-like structure obtained may be those which contain talc, expanded volcanic ash, calcium carbonate, rubber particles, synthetic resin particles, etc.

The size of the watering orifices in the outer layer (A) of the structure of the invention can be varied according to the purpose of irrigation. The shape of each orifice may be circular, elliptic, polygonal, etc., as needed. For agricultural and horticultural irrigation, the orifices are preferably slit-shaped. Each slit may be straightly linear, semicircular, arcuate, X-shaped, T-shaped, Y-shaped, etc. Since the tubular structure of this invention assumes an expanded tubular shape at the time of passing water through it, and a flattened tubular shape in the absence of water supply, the structure of the invention is free from the blockage of the watering orifices which is caused in conventional rigid pipelines by soils, sands and other solid matters drawn into the orifices on stopping the water supply. This preventing effect is promoted when the watering orifices are slit-shaped. It is preferred therefore that the watering orifices in the outer layer (A) of the structure of the invention be slit-shaped. The size of such watering orifices is preferably about 60 microns to about 2000 microns, more preferably about 60 microns to about 500 microns. It is possible to provide watering orifices of various shapes and/or sizes in a single tubular structure of this invention. Preferably, however, the watering orifices in a single structure should be of the same shape and size.

The size of watering orifices in this invention is determined in the following manner.

A film or sheet which constitutes the outer layer (A) or inner layer (B) is formed into a tubular shape. One end of the tube is sealed, and an aqueous slurry obtained by suspending small glass spheres having a distribution of outside diameters from 1 micron to 2000 microns in water is introduced into the tube at the other end under a pressure of 1 kg/cm$^2$. The diameter of a glass sphere having the largest diameter among those which have flowed out from the wall of the tube together with water is determined, and defined as the size of watering orifices.

The orifice size, so determined is preferably about 60 microns to about 2000 microns, more preferably about 60 microns to about 500 microns, for the outer layer of the tubular structure of this invention, and preferably about 1 micron to about 300 microns, more preferably about 1 micron to about 100 microns, for the inner layer.

The amount of water permeation of the outer and inner layers of the structure of this invention is determined by passing water along under a pressure of 0.2 kg/cm$^2$ through the same testing tube as used in the determination of orifice size, and defined as the amount (liter) of water which flows out per unit length (meter) of the tube per unit time (minute). In the tubular structure of this invention, the outer layer has an amount of water permeation of perferably about 0.005 to about 5 liters/min./m, more preferably about 0.1 to about 0.5 liter/min/m, and the inner layer has an amount of water permeation of preferably at least about 1 liter/min/m, more preferably about 5 to about 30 liters/min/m.

Films and sheets for the outer and inner layers are so selected that within the ranges of preferred amounts of water permeation specified above, the amount of water permeation of the inner layer is larger than that of the outer layer. The size of the watering orifices in the inner layer is made smaller than the size of the watering orifices of the outer layer in order to separate solid particles which may block up the orifices of the outer layer from the supplied water. At this time, the size of the watering orifices of the outer layer is made preferably at least about 1.5 times, more preferably at least about 3 times, that of the inner layer. When the inner layer (B) is composed of a plurality of water-permeable sheets, the water-permeable sheets in the inner layer should be isolated from each other, and should be arranged such that the amount of water permeation of a sheet located inwardly is larger than that of a sheet located outwardly of it.

Some embodiments of the flexible multilayer tubular structure of this invention are described below by reference to the accompanying drawings in which:

FIGS. 1 to 6 are sectional views showing various forms of the tubular structure of the invention in the expanded state in which the inner layer (B) is a single layer of sheet;

FIGS. 1' to 6' are sectional views similar to FIGS. 1 to 6 except that the inner layer is composed of two layers of sheet;

FIG. 1-a is a sectional view of the same tubular structure as shown in FIG. 1 except that it is in the flattened state in the absence of water supply;

FIG. 1'-a is a sectional view similar to FIG. 1-a showing the tubular structure shown in FIG. 1' in the flattened state;

FIG. 1-b is a partial perspective view of the structure of FIG. 1;

FIGS. 7 to 10 are sectional views, similar to FIGS. 1' to 6', showing other embodiments in which the inner layer (B) is composed of two layers of sheet;

FIGS. 11 and 11' schematically show the production of the multilayer tubular structure of this invention; and FIGS. 12 and 12' show modified embodiments of fixing the side edges of the inner layer (B) to the outer layer (A).

In the drawings, A represents an outer layer; B an inner layer (where there are two layers of sheets, they are designated by $B_1$ and $B_2$); 1, watering orifices provided in the outer layer; and 2, a fin-like heat-sealed portion.

In the embodiments shown in FIGS. 1 and 2, FIGS. 1' and 2', FIGS. 5 and 6, and FIGS. 5' and 6', two fin-like heat-sealed portions are provided at substantially opposing positions in the cross-section of the tubular structure of the invention; and one side edge in the widthwise direction of the inner layer is fixed to one of the heat-sealed portions along the length of the inner layer, and the outer side edge, to the other heat-sealed portion.

In the embodiments shown in FIGS. 3 and 4 and FIGS. 3' and 4', one heat-sealed portion is provided in the tubular structure of the invention, and both side edges in the widthwise direction of the inner layer are fixed at this heat-sealed portion.

In the embodiments shown in the drawings, the side edges of the inner layer (B) are fixed to the fin-like heat-sealed portions of the outer layer (A). In modified embodiments, the side edges of the inner layer (B) may be fixed to the outer layer (A) at positions which are parallel to the heat-sealed portions and apart from, or adjacent to, them, as shown in FIGS. 12 and 12'.

The embodiments shown in FIGS. 1, 2, 1', 2', 5, 6, 5', and 6' are preferred in view of the ease of production and good fixing strength.

FIGS. 7 to 10 show a combination of the two types of embodiments shown above.

The inner layer (B) or ($B_2$), ($B_1$) is located inwardly of the outer layer (A) so that water is forced into a space c, passes through the inner layer (B) or ($B_2$), ($B_1$), and flows out from the watering orifices of the outer layer (A).

In the tubular structure of this invention, a clearance tends to occur between the outer layer (A) and the inner layer (B) or (B$_2$), (B$_1$) during the supply of water mainly because the water permeability of the inner layer is greater than that of the outer layer as shown, for example, in FIG. 1, although the degree of the clearance varies according to the materials of the outer and inner layers. The pressence of this clearance promotes uniform watering. Even when the water permeability of the inner layer decreases locally by solid foreign particles present in the supplied water, the clearance serves to prevent the reduction of the overflooding power of those watering orifices of the outer layer (A) which correspond to that locality of the inner layer of which water-permeability has thus been reduced.

The flexible multilayer tubular structure of this invention can be produced continuously, easily, and at low costs.

One embodiment of the manufacturing process is shown in FIGS. 11 and 11'. A water-permeable, water-insoluble tape-like continuous film (B) for forming the inner layer is interposed between a tape-like continuous film (A) or a thermoplastic synthetic resin or which many watering orifices 1 (preferably, slit-shaped ones) spaced longitudinally thereof have been provided by a perforating device 3, and a perforated or non-perforated tape-like continuous film (A') of a thermoplastic synthetic resin. In this condition, the tapes are advanced, and continuously overlaid. The resulting multilayer sheet-like structure 9 is advanced and continuously heat-sealed at its both side edges in the widthwise direction. The overlaid multilayer sheet-like structure 9 is passed between a pair of heat-sealing belts 4 rotated by drive rollers 6, and its both side edges in the widthwise direction are continuously heat-sealed by hot plates 5 on both sides of the sheet-like structure 9. If desired, the fin-like heat-sealed portions 2 formed may be cooled by a pair of cooling rollers 7, and then the resulting structure is taken up by a take-up roller 8.

In this embodiment, a film or fabric in the form of a tape having the width of the final product is used. If desired, films or fabrics of broader widths may be used. They are heat-sealed at desired intervals, and then cut apart at the heat-sealed portions thereby to form a plurality of tubular structures. For example, the flexible multilayer tubular structure of this invention may be produced in accordance with this embodiment by a method which comprises positioning a water-permeable, water-insoluble continuous film (B), preferably a non-woven fabric, between a continuous thermoplastic resin film (A) having many watering orifices 1 provided longitudinally thereof and also having a width at least about two times the width of the final product and a continuous thermoplastic synthetic resin film (A') of the same width which is perforated or non-perforated, overlaying these films continuously while advancing them in this condition, continuously heat-sealing the overlaid multilayer sheet-like structure at three or more positions at the desired intervals in its widthwise direction while advancing it, and cutting the heat-sealed portions substantially along the center line of each heat-sealed portion on the multilayer tubular structure.

The flexible multilayer tubular structure of this invention having two continuous fin-like heat-sealed portions extending longitudinally of the outer layer can be produced by either of these two embodiments.

In the production of the tubular structure having one continuous fin-like heat-sealed portion of the type shown in FIGS. 3 and 4 and FIGS. 3' and 4', a thermoplastic synthetic film A having watering orifices disposed longitudinally thereof at suitable intervals and a sheet B (or B$_1$ and B$_2$) for forming the inner layer B are overlaid, and the both edges in the widthwise direction of the resulting multilayer sheet-like structure are continuously superimposed. The superimposed portions are then continuously heat-sealed.

A tubular structure of the type shown in FIGS. 7 to 10 can be produced in the same way as in the first-mentioned embodiment except that the overlaying is carried out in the manner shown in these Figures. In order to obtain sufficient heat-sealing strength of the heat-sealed portion, adhesives, hot-melt type adhesive resin tapes, etc. may be used at the heat-sealed portions. Such modified embodiments are also within the scope of the present invention.

The flexible multilayer tubular structure of this invention is extremely simple to install. For example, it can be installed while it is unwound from a reel of the structure of a desired length. Or it is cut to the desired lengths, and connected by using, for example, rigid plastic pipes as joints. Or by-passes of the tubular structure can be easily formed by means of by-passing joints.

What we claim is:

1. A multilayer tubular structure for irrigation, which comprises
    (A) a flexible outer layer comprising a tube of a thermoplastic synthetic resin film having at least one continuous fin-like heat-sealed portion extending longitudinally of the outer layer and a plurality of slit-shaped watering orifices spaced longitudinally of the outer layer at given intervals, and
    (B) at least one flexible inner layer comprising a water-permeable, water-insoluble non-woven sheet obtained by forming fibers of a thermoplastic synthetic resin and other fibers which do not melt at the melting point of the synthetic resin into a sheet form, and heat-treating the resulting structure at a temperature above the melting point of the thermoplastic synthetic resin fibers but below the temperature at which the other fibers melt, thereby to bond the fibers to one another located inwardly of the outer layer and fixed to the outer layer, said sheet being permeable to a larger amount of water than the film which constitutes the outer layer (A); said tubular structure assuming an expanded tubular shape when water is passed through it and a flattened tubular shape when water is not passed through it, said expanded tubular shape including a clearance between the outer layer (A) and inner layer (B), the outer layer (A) and the inner layer (B) being isolated from each other over a greater part of the structure at least including the watering orifices in the outer layer, and the inner layer (B) being located inwardly of the outer layer (A) so that water supplied passes through the inner layer (B) and flows out from the watering orifices in the outer layer (A).

2. The tubular structure of claim 1 wherein the inner layer (B) is composed of at least two mutually isolated water-permeable non-woven sheets obtained by forming fibers of a thermoplastic synthetic resin and other fibers which do not melt at the melting point of the synthetic resin into a sheet form, and heat-treating the resulting structure at a temperature above the melting point of the thermoplastic sythetic resin fibers but below the temperature at which the other fibers melt, thereby to bond the fibers to one another, in which the amount of water permeation of a sheet located inwardly is larger than that of a sheet located outwardly of it.

3. The tubular structure of claim 1 wherein two fin-like heat-sealed portions are provided at substantially opposing positions in the cross-section of the tubular structure, and wherein along the length of the inner layer, one side edge in the widthwise direction of the inner layer is fixed to one of the heat-sealed portions, and the other side edge, to the other heat-sealed portion.

4. The tubular structure of claim 1 wherein two fin-like heat-sealed portions are provided at substantially opposing positions in the cross-section of the tubular structure, and wherein along the length of the inner layer, one side edge in the widthwise direction of the inner layer is fixed to the outer layer at a position inwardly of one of the heat-sealed portions in parallel thereto, and the other side edge, to the outer layer at a position inwardly of the other heat-sealed portion in parallel thereto.

5. The tubular structure of claim 1 wherein the amount of water permeation of the outer layer tube is about 0.005 to about 5 liters/min/m.

6. The tubular structure of claim 1 wherein the amount of water permeation of the inner layer sheet is at least about 1 liter/min/m.

7. A process for producing the tubular structure of claim 1, which comprises positioning a water-permeable, water-insoluble tape-like continuous film of said non-woven fabric between a tape-like continuous film of a thermoplastic synthetic resin having a plurality of slit-shaped watering orifices provided therein longitudinally of the film and a tape-like continuous film of a thermoplastic synthetic resin having or not having watering orifices, overlaying these films continuously while they are advanced in this connection, and continuously heat-sealing both side edges in the widthwise direction of the resulting multilayer sheet-like structure while it is advanced.

8. The tubular structure of claim 1 wherein the size of the slit-shaped watering orifices in the outer layer (A) is from about 60 microns to about 2,000 microns.

9. The tubular structure of claim 1 wherein the size of the slit-shaped watering orifices of the outer layer (A) is from about 60 microns to about 500 microns.

10. The tubular structure of claim 1 wherein the amount of water permeation of the outer layer tube is about 0.05 to about 5 liters/min/m and the amount of water permeation of the inner layer sheet is at least about 1 liter/min/m.

11. The tubular structure of claim 1 wherein the amount of water permeation of the outer layer tube is about 0.1 to about 0.5 liters/min/m and the amount of water permeation of the inner layer sheet is about 5 to about 30 liters/min/m.

* * * * *